(12) United States Patent
Hackett et al.

(10) Patent No.: US 9,330,368 B2
(45) Date of Patent: *May 3, 2016

(54) ROUTING SERVICE REQUESTS BASED ON LOWEST ACTUAL COST WITHIN A FEDERATED VIRTUAL SERVICE CLOUD

(71) Applicant: INTERNATIONAL BUSINESS MACHINES CORPORATION, Armonk, NY (US)

(72) Inventors: Joseph Hackett, Flower Mound, TX (US); Leonard S. Hand, Red Creek, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/170,715

(22) Filed: Feb. 3, 2014

(65) Prior Publication Data

US 2014/0149171 A1 May 29, 2014

Related U.S. Application Data

(63) Continuation of application No. 13/106,230, filed on May 12, 2011, now Pat. No. 8,676,981.

(51) Int. Cl.
*G06F 15/173* (2006.01)
*G06Q 10/06* (2012.01)
*G06Q 10/10* (2012.01)
*G06F 9/50* (2006.01)

(52) U.S. Cl.
CPC ........ *G06Q 10/06315* (2013.01); *G06F 9/5072* (2013.01); *G06Q 10/06* (2013.01); *G06Q 10/101* (2013.01)

(58) Field of Classification Search
CPC ............ H04L 67/1008; H04L 67/1012; H04L 67/1031; G06F 9/5011; G06F 9/5061; G06F 9/5072; G06Q 30/04; G06Q 30/08
USPC ...................... 709/226, 241; 705/80; 717/177
See application file for complete search history.

(56) References Cited

U.S. PATENT DOCUMENTS

| | | | |
|---|---|---|---|
| 8,392,574 B1 * | 3/2013 | Shah et al. ..................... 709/226 |
| 2009/0276771 A1 * | 11/2009 | Nickolov et al. ............. 717/177 |
| 2009/0300210 A1 | 12/2009 | Ferris | |
| 2010/0088205 A1 | 4/2010 | Robertson | |
| 2010/0223385 A1 | 9/2010 | Gulley et al. | |
| 2010/0235903 A1 | 9/2010 | Carter et al. | |
| 2010/0306379 A1 | 12/2010 | Ferris | |
| 2011/0213712 A1 * | 9/2011 | Hadar et al. ..................... 705/80 |
| 2012/0096183 A1 * | 4/2012 | Mercuri ......................... 709/241 |
| 2012/0290725 A1 * | 11/2012 | Podila ........................... 709/226 |

* cited by examiner

*Primary Examiner* — Dustin Nguyen
(74) *Attorney, Agent, or Firm* — Steven M. Greenberg, Esq.; CRGO Law

(57) ABSTRACT

A method for providing a virtual cloud service at the lowest actual cost can begin with an optimal transaction handler of a federated virtual service cloud maintaining a virtual resource pool of transactional units. Each transactional unit can represent a service application deployed to a cloud service provided by a cloud service provider having a usage-based service cost model that allows transactional units to be placed in an inactive state to suspend its operating expense. Operational metrics data for the cloud service providers can be continuously captured. In response to a service request, the transactional unit that meets fulfillment requirements of the service request and incurs a lowest actual cost can be determined based upon cost factors derived from the operational metrics data, the usage-based service cost model, and a current usage state of the virtual resource pool. The received service request can be routed to the determined transactional unit.

20 Claims, 5 Drawing Sheets

Example Lowest Actual Cost Determination Matrix  500

Cloud Service Providers  505

| Cost Factors  510 | | Cloud A | Cloud B | Cloud Y | Cloud Z |
|---|---|---|---|---|---|
| 515 | Location | US East | US West | Japan | Germany |
| | Transaction Latency | 30ms | 35ms | 50ms | 25ms |
| | Bandwidth | 100Mbs | 350Mbs | 15Mbs | 25Mbs |
| | Calculated Latency | 450ms | 420ms | 1500ms | 800ms |
| 520 | SLA met ? | Yes | Yes | No | Yes |
| 525 | Current Transaction Cost | $0.24 | $0.35 | $0.50 | $0.15 |
| | Provisioning Required ? | Yes | No | No | No |
| | Provision Cost | $1.50 | $1.25 | $2.00 | $1.60 |
| | De-provision Imminent ? | No | No | No | Yes |
| 530  Calculated Actual Cost | | $1.74 | $0.35 | N/A | $1.75 |

ROUTING SERVICE REQUESTS BASED ON LOWEST ACTUAL COST WITHIN A FEDERATED VIRTUAL SERVICE CLOUD

CROSS-REFERENCE TO RELATED APPLICATION

This continuation application claims the benefit of U.S. patent application Ser. No. 13/106,230 (now U.S. Pat. No. 8,676,981) filed 12 May 2011, entitled "ROUTING SERVICE REQUESTS BASED ON LOWEST ACTUAL COST WITHIN A FEDERATED VIRTUAL SERVICE CLOUD", which is assigned to the assignee of the present application.

BACKGROUND

The present invention relates to the field of cloud computing, and, more particularly, to routing service requests based on lowest actual cost within a federated virtual service cloud.

As the use of cloud services becomes commonplace in business practices, new approaches to providing cloud services have blossomed. One such new approach is the use of a virtual service cloud. Like typical cloud service providers, a virtual service cloud offers a cloud service or transaction. However, performance of the cloud service or transaction utilizes the resources of other cloud service providers; the virtual service cloud operates its cloud service within the cloud services of other cloud service providers.

For example, a virtual service cloud offering a credit card processing service instantiates its credit card processing service application within supporting cloud services that it has subscribed. That is, the virtual service cloud subscribes to other cloud services to support operation of its service application.

As such, the expenses incurred by the virtual service cloud depend upon the costs of using the supporting cloud services. Further, these operating costs for cloud services tend to fluctuate over time (i.e., different rates for different times of the day and day of the week).

The recent adoption of usage-based service cost models by cloud service providers that allow subscribed cloud services and/or blocks of cloud services to be switched on and off provides a fine-level of control for operating expenses. However, conventional virtual service clouds are unable to accommodate this level of expense control using current resource management and routing approaches.

BRIEF SUMMARY

One aspect of the present invention can include a method for providing a federated virtual cloud service at the lowest actual cost. Such a method can begin with an optimal transaction handler component of a federated virtual service cloud the maintaining a virtual resource pool of transactional units. Each transactional unit can represent a service application that is deployed to a supporting cloud service provided by a cloud service provider that the federated virtual service cloud subscribes. The cloud service provider can utilize a usage-based service cost model to provide cloud services. The usage-based service cost model can allow transactional units to be placed in an active state or an inactive state. Transactional units in the inactive state can be considered unused in terms of the usage-based service cost model, and, therefore, incur no cost beyond an initial subscription cost. Operational metrics data can be continuously captured from the cloud service providers hosting the transactional units of the virtual resource pool. In response to a received service request for a service provided by the federated virtual service cloud, the transactional unit that meets fulfillment requirements of the received service request and incurs a lowest actual cost for the federated virtual service cloud can be determined. This determination can be based upon cost factors derived from the captured operational metrics data, the usage-based service cost model of the cloud service provider, and a current usage state of the virtual resource pool. The received service request can then be routed to the determined transactional unit for performance of the requested service.

Another aspect of the present invention can include a system for optimally routing service requests in a federated virtual service cloud. Such a system can include cloud service providers and a federated virtual service cloud. The cloud service providers can provide cloud services in accordance with a usage-based service cost model. The federated virtual service cloud can include a cloud service provider manifest, operational metrics data, a service application, a virtual resource pool, and an optimal transaction handler. The cloud service provider manifest can define two or more cloud service providers that the federated virtual service cloud is authorized to subscribe to for cloud services. The operational metrics data can be captured for cloud service providers having an active subscription with the federated virtual service cloud. The service application can be configured to provide the service offered by the federated virtual service cloud. The virtual resource pool can include multiple transactional units. A transactional unit can represent the deployment of the service application to a cloud service provided by a cloud service provider contained in the cloud service provider manifest. The optimal transaction handler can be configured to route received service requests to the transactional unit that meets a service-level agreement (SLA) of the received service request and incurs a lowest actual cost for the federated virtual service cloud.

Yet another aspect of the present invention can include a computer program product that includes a computer readable storage medium having embedded computer usable program code. The computer usable program code configured to maintain a virtual resource pool of transactional units for a federated virtual service cloud. Each transactional unit can represent a service application deployed to a supporting cloud service provided by a cloud service provider that the federated virtual service cloud subscribes. The cloud service provider can utilize a usage-based service cost model to provide cloud services. The usage-based service cost model can allow the transactional units to be placed in an active state or an inactive state. Transactional units in the inactive state can be considered to be unused in terms of the usage-based service cost model, and, therefore, incur no cost beyond an initial subscription cost. The computer usable program code can be configured to continuously capture operational metrics data from cloud service providers hosting the transactional units of the virtual resource pool. The computer usable program code can be further configured to, in response to a received service request for a service provided by the federated virtual service cloud, determine the transactional unit that meets fulfillment requirements of the received service request and incurs a lowest actual cost for the federated virtual service cloud. This determination can be based upon cost factors derived from the captured operational metrics data, the usage-based service cost model of the cloud service provider, and a current usage state of the virtual resource pool. The computer usable program code can then be configured to route the received service request to the determined transactional unit for performance of the service. In one embodiment, a pending removal or addition can also effect the costing structure.

BRIEF DESCRIPTION OF THE SEVERAL VIEWS OF THE DRAWINGS

FIG. 5 is an example lowest actual cost determination matrix that can be used by the optimal transaction handler in accordance with embodiments of the inventive arrangements disclosed herein.

DETAILED DESCRIPTION

Figure 1:
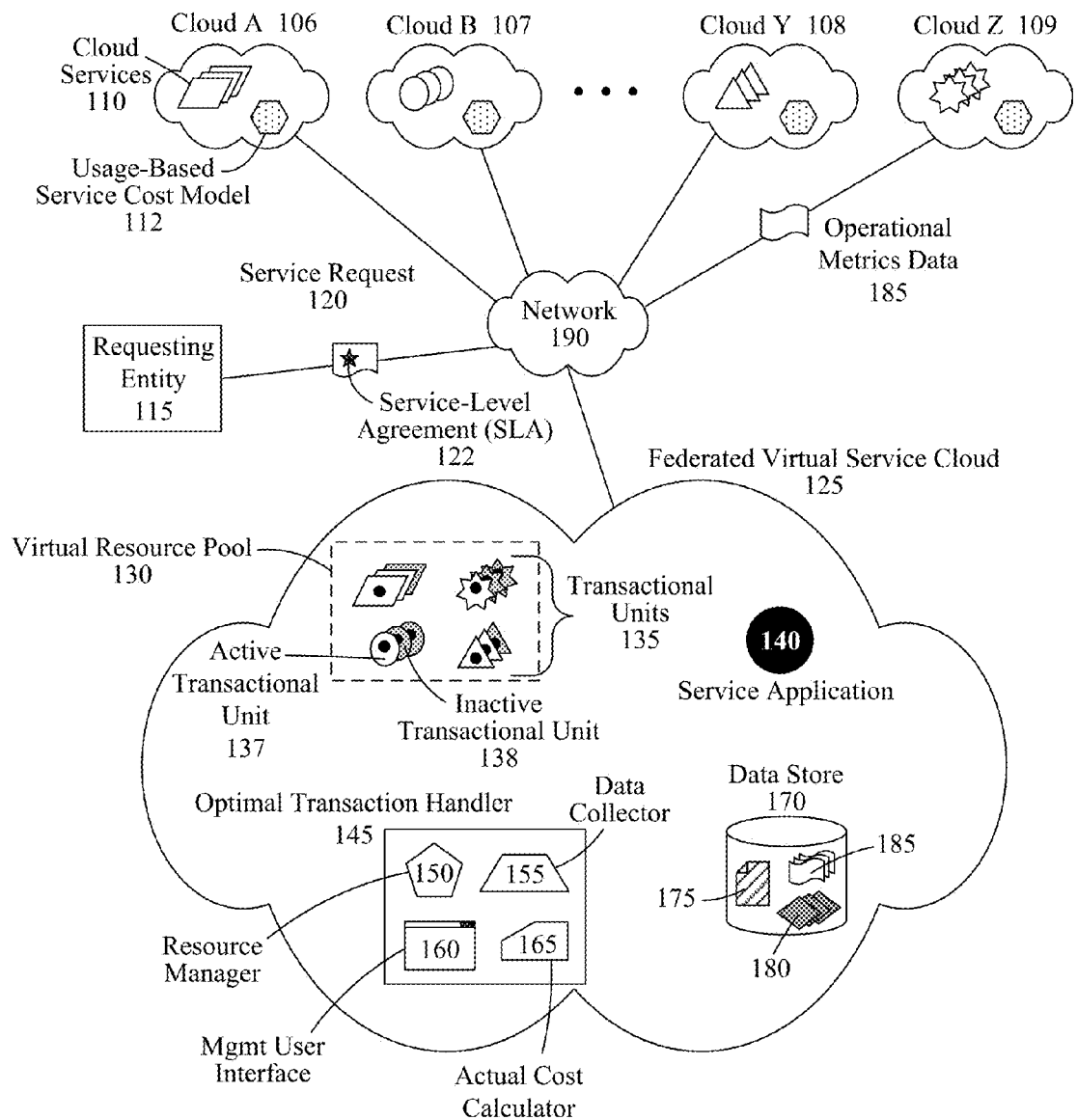
FIG. 1 is a schematic diagram illustrating a system that handles service requests for use of a service application provided by a federated virtual service cloud at the lowest actual cost in accordance with embodiments of the inventive arrangements disclosed herein.

The present invention discloses a solution for providing a federated virtual cloud service at the lowest actual cost using an optimal transaction handler. The service application representing the service of the federated virtual service cloud can be deployed to multiple cloud services to create a virtual resource pool of transactional units. The cloud services can be provided by other cloud service providers in accordance with a usage-based service cost model that allows for the subscription of a transactional unit to be suspended until reactivated. Based upon cost factors extracted/derived from operational metrics data and the usage-based service cost model of the cloud service providers, the optimal transaction handler can calculate an actual cost for each transactional unit that satisfies the service-level agreement of the service request. The optimal transaction handler can then route the service request to the transactional unit having the lowest calculated actual cost.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 that handles service requests 120 for use of a service application 140 provided by a federated virtual service cloud 125 at the lowest actual cost in accordance with embodiments of the inventive arrangements disclosed herein. In system 100, a requesting entity 115 can send a service request 120 over a network 190 to a federated virtual service cloud 125.

The requesting entity 115 can represent a person, software application, or computing system that generates the service request 120. The service request 120 can be an electronic message soliciting the performance of a service provided by the federated virtual service cloud 125. In addition to requestor information (e.g., user data, payment details), the service request 120 can include requirements called a service-level agreement (SLA) 122 that the federated virtual service cloud 125 must meet when providing the service.

The federated virtual service cloud 125 can represent the hardware and/or software components required to support the provisioning of one or more services that correspond to transactional units 135. Access to or usage of a transactional unit 135 can be provided by the federated virtual service cloud 125 in accordance with a predefined cost model (not shown).

The federated virtual service cloud 125 can include a virtual resource pool 130, a service application 140, an optimal transaction handler 145, and a data store 170. Data store 170 can contain a cloud service provider manifest 175, operational metrics data 185, and operating parameters 180.

The service application 140 can be a software program that the federated virtual service cloud 125 sells the usage of as a service to requesting entities 115. For example, the service application 140 can be a specialized software program that creates an employment history report for submitted data. To avoid overhead costs, the owner of the program can offer the software program 140 as a service of the federated virtual service cloud 125.

In order to be used, the service application 140 can require installation in an appropriate computing environment. Since the computing environment of the federated virtual service cloud 125 is typically minimal (i.e., only components to perform billing, routing, and management functions), the required infrastructure and/or computing platform resources can be provisioned from existing cloud service providers 105.

For example, the federated virtual service cloud 125 can comprise a single server that runs the optimal transaction handler 145 and has access to data store 170. The physical resources for hosting the transactional units 135 can be obtained by subscribing to cloud service providers 105 that provide these resources as cloud services 110.

It should be noted that the federated virtual service cloud 125 discussed within system 100 and the subsequent Figures utilizes "infrastructure as a service" (IaaS) or "platform as a service" (PaaS) cloud service providers 105. However, this embodiment of the present disclosure shown in system 100 can be used in conjunction with "software as a service" (SaaS) cloud service providers 105 as well, without departing from the spirit of the present disclosure.

A cloud service provider 105 can represent a specific implementation of a cloud computing environment that offers cloud services 110 according to a usage-based service cost model 112. As shown in system 100, many cloud service providers 105 can exist, each providing a cloud service 110 according to an individual usage-based service cost model 112. Multiple cloud service providers 105 can offer the same type of cloud service 110 with differing usage-based service cost models 112. Further, a single cloud service provider 105 can offer different types of cloud services 110, having different or similar usage-based service cost models 112.

Thus, the federated virtual service cloud 125 can subscribe to various cloud service providers 105 to obtain the type and quantity of computing resources it requires to support operation of the service application 140. Cloud service providers 105 that the federated virtual service cloud 125 is authorized to subscribe to can be defined in the cloud service provider manifest 175 contained in the data store 170.

Installation of the service application 140 in a subscribed cloud service 110 can represent a single transactional unit 135 (i.e., all the hardware/software resources necessary to provide a single instance of the service) available to the federated virtual service cloud 125. All the transactional units 135 created by the federated virtual service cloud 125 can be collectively referred to as the virtual resource pool 130 (i.e., virtual, not actual, resources used by the federated virtual service cloud 125).

It should be noted that, although, the virtual resource pool 130 is shown in system 100 as a component of the federated virtual service cloud 125, that the actual transactional units 135 exist at their corresponding cloud service providers 105. That is, transactional units 135 created using cloud services 110 from Cloud A 105 can physically reside in the computing components of Cloud A 105 and so on. From the perspective of the federated virtual service cloud 125, and, therefore, the optimal transaction handler 145, the transactional units 135 of the virtual resource pool 130 can be seen as belonging to or having been provisioned to the federated virtual service cloud 125.

Transactional units 135 contained in the virtual resource pool 130 can be further distinguished by a current state of their subscription. Active transactional units 137 can correspond to those transactional units 135 whose subscription is currently active, representing a current operating expense on the part of the federated virtual service cloud 125. An active transactional unit 137 can be readily utilized by a service request 120.

An inactive transactional unit 138 can represent a transactional unit 135 whose subscription is currently suspended, and, therefore, does not incur an operating expense. An inactive transactional unit 138 can require activation of its subscription prior to use by a service request 120 (i.e., an inactive transactional unit 138 must be turned "ON" before use).

It should be noted that the specific names used to identify these states of the transactional units 135 can vary based on cloud service provider 105 and/or specific usage-based service cost model 112. However, the main point of distinction, regardless of name, should focus on the incurrence of cost by the federated virtual service cloud 125. That is, at any point in time, the current operating expense of the federated virtual service cloud 125 for the virtual resource pool 130 should be based upon the quantity of active transactional units 137.

For example, the operating expense for a virtual resource pool 130 having three active transactional units 137 would be the sum of the subscription cost for each active transactional units 137, based upon the specific usage-based service cost model 112 of the hosting cloud service providers 105.

The optimal transaction handler 145 can be a software component of the federated virtual service cloud 125 configured to cost-effectively handle the transactions of the federated virtual service cloud 125. As used herein, the term "cost-effectively" is used to denote actions taken in a manner such that the lowest actual cost can be incurred by the federated virtual service cloud 125.

To support its functionality, the optimal transaction handler 145 can include a resource manager 150, a data collector 155, a management user interface 160, and an actual cost calculator 165. The resource manager 150 can represent the component of the optimal transaction handler 145 that handles actions that affect the virtual resource pool 130. Since the cloud service 110 subscriptions that support transactional units 135 can be effectively turned "ON" and "OFF", the resource manager 150 can dynamically change the size and/or composition of the virtual resource pool 130.

For example, the resource manager 150 can increase the quantity of active transactional units 137 (i.e., activate inactive transactional units 138) when the federated virtual service cloud 125 experiences a high volume of service requests 120 and decrease this amount during a period of low volume.

The resource manager 150 can utilize one or more operating parameters 180 when determining how to change the size and/or composition of the virtual resource pool 130. For example, the operating parameters 180 can include threshold values that define a minimum amount of active transactional units 137 and a maximum amount of inactive transactional units 138 for the composition of the virtual resource pool 130.

Further, the resource manager 150 can utilize the calculations of the actual cost calculator 165 to determine, in a cost-effective manner, which transactional units 135 to activate or deactivate. Since the federated virtual service cloud 125 is a federation of transactional units 135 from multiple cloud service providers 105, the operating cost of activating or deactivating transactional units 135 can vary based on cloud service provider 105 and/or usage-based service cost model 112.

For example, it can be more cost-effective to use an active transactional unit 137 from a cloud service provider 105 having a high cost per transaction and low activation cost than activate an inactive transactional unit 138 from a cloud service provider 105 having a low cost per transaction and high activation cost, assuming both transactional units 135 satisfy the SLA 122 of the service request 120.

The actual cost calculator 165 can be the software component of the federated virtual service cloud 125 configured to determine the actual cost incurred by the usage of transactional units 135 from different cloud service providers 105, which can be used by the resource manager 150 when making changes to the virtual resource pool 130. To determine the actual cost, the actual cost calculator 165 can utilize information contained in the usage-based service cost models 112 of the corresponding cloud service providers 105, operational metrics data 185 for the cloud service providers 105, and/or operating parameters 180.

It is important to emphasize that the actual cost calculator 165 of the optimal transaction handler 145 can take into account data that conventional calculation components neglect like the need and cost to provision another transactional unit 135 to handle the service request. Additionally, the information provided by the actual cost calculator 165 can be applied to the management of the virtual resource pool 130 as well as the routing of service requests 120.

The operational metrics data 185 can correspond to feedback data captured from cloud service providers 105 regarding the performance of transactional units 135 as well as the cloud service providers 105. The operational metrics data 185 can be aggregated by the data collector 155 of the optimal transaction handler 145. The data collector 155 can be configured to capture the operational metrics data 185 from the cloud service providers 105 having active subscriptions and store the operational metrics data 185 in the data store 170.

The operating parameters 180 can represent user-configurable variables for adjusting the operation of the optimal transaction handler 145. For example, the time required to perform the service can be an element of operational metrics data 185, while the minimum amount of active transactional units 137 can be represented as an operating parameter 180.

The operating parameters 180 can also be used to express preferences on behalf of an administrator of the federated virtual service cloud 125. For example, cloud service providers 105 can be assigned a reliability rating that can be used as a factor when choosing between cloud service providers 105.

In another contemplated embodiment, the actual cost calculator 165 can be augmented with a data analysis component. In such an embodiment, the data collector 155 can be further configured to capture historical data regarding operation of the federated virtual service cloud 125. This embodiment can implement a predictive aspect to the management of the virtual resource pool 130, where the size and/or composition can be modified in response to expected peaks and lows.

Definition of the operating parameters 180 and/or cloud service provider manifest 175 can be performed using the management user interface 160 of the optimal transaction handler 145.

In another embodiment, the federated virtual service cloud 125 of system 100 can offer multiple service applications 140 that can deployed to share cloud services 110. In such an embodiment, the components of the optimal transaction handler 145 can be configured to account for this extra level of complexity.

Network 190 can include any hardware/software/and firmware necessary to convey data encoded within carrier waves. Data can be contained within analog or digital signals and conveyed though data or voice channels. Network 190 can include local components and data pathways necessary for communications to be exchanged among computing device components and between integrated device components and peripheral devices. Network 190 can also include network equipment, such as routers, data lines, hubs, and intermediary servers which together form a data network, such as the Internet. Network 190 can also include circuit-based communication components and mobile communication components, such as telephony switches, modems, cellular communication towers, and the like. Network 190 can include line based and/or wireless communication pathways.

As used herein, presented data store 170 can be a physical or virtual storage space configured to store digital information. Data store 170 can be physically implemented within any type of hardware including, but not limited to, a magnetic disk, an optical disk, a semiconductor memory, a digitally encoded plastic memory, a holographic memory, or any other recording medium. Data store 170 can be a stand-alone storage unit as well as a storage unit formed from a plurality of physical devices. Additionally, information can be stored within data store 170 in a variety of manners. For example, information can be stored within a database structure or can be stored within one or more files of a file storage system, where each file may or may not be indexed for information searching purposes. Further, data store 170 can utilize one or more encryption mechanisms to protect stored information from unauthorized access.

Figure 2:
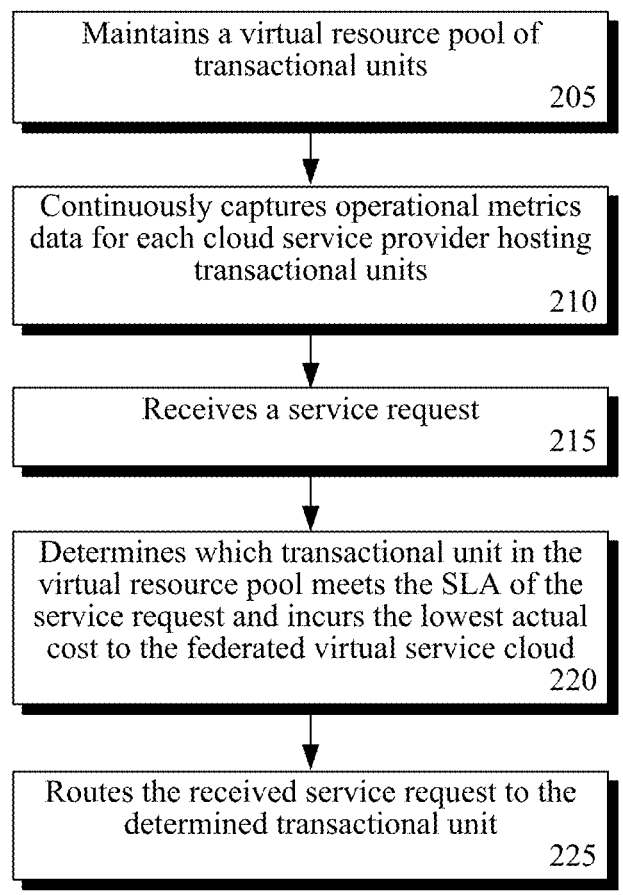
FIG. 2 is a flow chart of a method detailing, at a high-level, the operation of the optimal transaction handler in accordance with an embodiment of the inventive arrangements disclosed herein.

FIG. 2 is a flow chart of a method 200 detailing, at a high-level, the operation of the optimal transaction handler in accordance with embodiments of the inventive arrangements disclosed herein. Method 200 can be performed within the context of system 100.

Method 200 can begin in step 205 where the optimal transaction handler can maintain a virtual resource pool of transactional units. Step 205 can be performed by the resource manager 150 of system 100.

In step 210, operational metrics data can be continuously captured for each cloud service provider hosting transactional units. Step 210 can be performed by the data collector 155 of system 100. A service request can be received in step 215.

In step 220, the transactional unit in the virtual resource pool that meet the SLA of the service request and incurs the lowest actual cost to the federated virtual service cloud can be determined. Performance of step 220 can utilize the actual cost calculator 165 of system 100. The service request can then be routed to the determined transactional unit in step 225.

Figure 3:
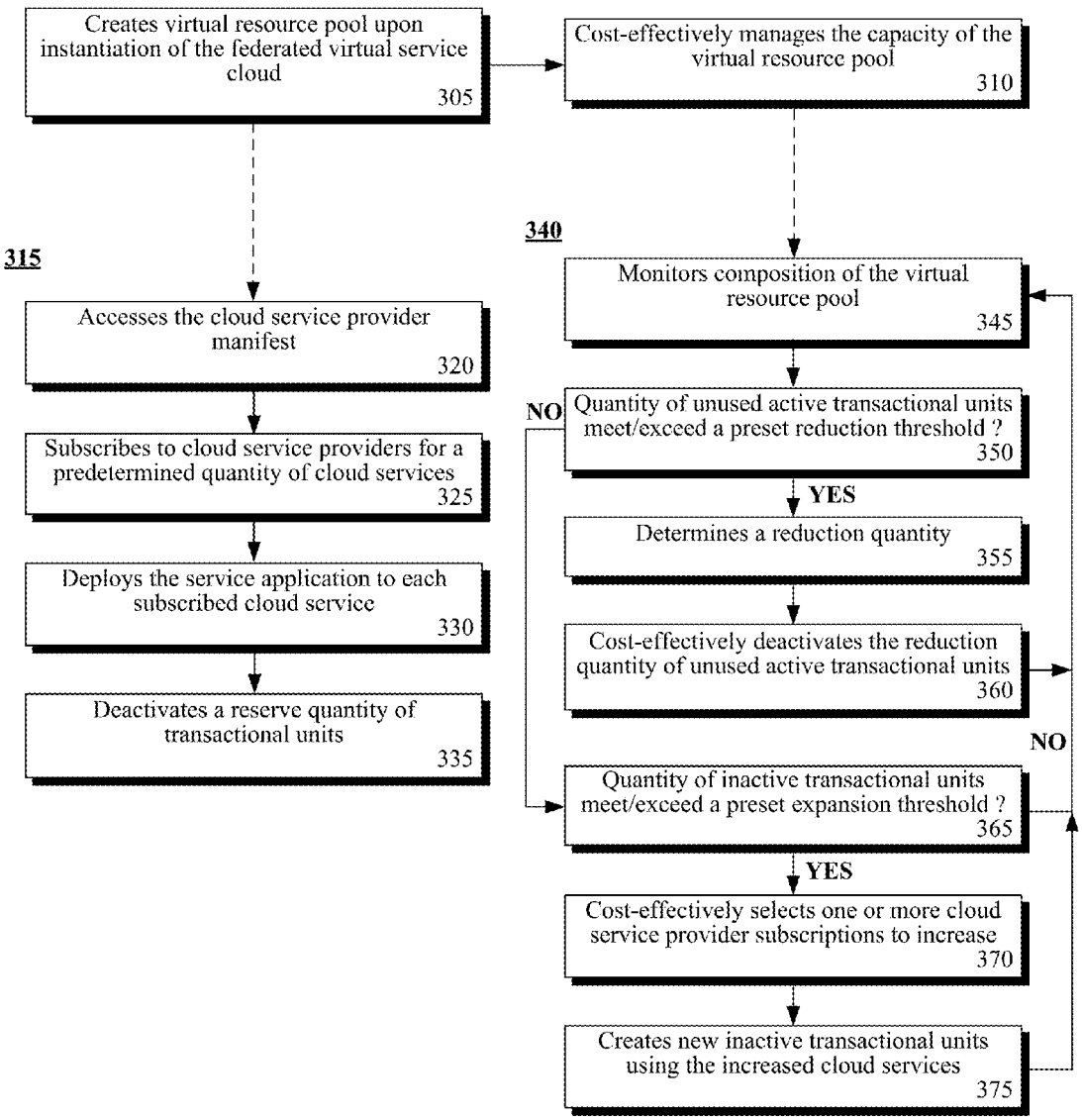
FIG. 3 shows flow charts of methods describing the management of the virtual resource pool by the optimal transaction handler in accordance with an embodiment of the inventive arrangements disclosed herein.

FIG. 3 shows flow charts of methods 300, 315 and 340 describing the management of the virtual resource pool by the optimal transaction handler in accordance with embodiments of the inventive arrangements disclosed herein. Methods 300, 315, and/or 340 can be performed within the context of system 100 and/or as an embodiment of step 205 of method 200.

Method 300 can begin in step 305 where the optimal transaction handler can create the virtual resource pool when the federated virtual service cloud is first initialized or instantiated. After creation of the virtual resource pool, the capacity of the virtual resource pool can be cost-effectively managed in step 310 until the federated virtual service cloud is terminated.

Method 315 can express step 305 of method 300 in finer detail. Creation of the virtual resource pool can begin in step 320 with the accessing of the cloud service provider manifest. Cloud service providers in the cloud service provider manifest can then be subscribed to for a predetermined quantity of cloud services in step 325.

The predetermined quantity of step 325 can correspond to an operating parameters defined by an administrator of the federated virtual service cloud. For example, in step 325, the optimal transaction handler can subscribe to three cloud service providers having the current lowest actual costs for five cloud services each, where the amount, "five", would correspond to the predetermined quantity.

In step 330, the service application can be deployed to each subscribed cloud service, creating a virtual resource pool of active transactional units. A reserve quantity of transactional units can then be deactivated in step 335.

Again, the reserve quantity can be an operating parameter expressing a subset of the transactional units to switch to the inactive state. This reserve quantity can represent an operational buffer for handling the typical fluctuation in service request volume.

It is important to note that the steps of method 315 can essentially illustrate the concept of over-subscribing the cloud services of a cloud service provider, with the extra or reserve quantity provisioned to the federated virtual service cloud, but in the inactive state where cost for the subscription is not accrued. This provides the optimal transaction handler with the ability to dynamically and expediently expand/reduce the virtual resource pool by toggling the transactional units between the active and inactive states.

Method 340 can express step 310 of method 300 in finer detail. The cost-effective management of the virtual resource pool can begin in step 345 with the monitoring the composition of the virtual resource pool. Composition values of particular note can be the quantity of unused active transactional units and the quantity of inactive transactional units.

It can be determined, in step 350, if the quantity of unused active transactional units meets or exceeds a preset reduction threshold. Unused active transactional units can represent idle active transactional units that are currently incurring a cost without generating income.

When the preset reduction threshold is met or exceeded, step 355 can execute where the optimal transaction handler can determine a reduction quantity (i.e., the quantity of excess transactional units to trim). Unused active transactional units can then be cost-effectively deactivated to meet the reduction quantity in step 360.

For example, when the quantity of unused active transactional units in the virtual resource pool reaches the reduction threshold of four, the four most cost-effective (i.e., saves the most expense without affecting quality of service) unused active transactional units can be deactivated.

Upon completion of step 360, flow of method 340 can return to step 345 where monitoring of the composition of the virtual resource pool can continue.

When the preset reduction threshold is not met/exceeded, step 365 can execute where it can be determined if the quantity of inactive transactional units meets or exceeds a preset expansion threshold. The reserve quantity of method 315 can be used as the preset expansion threshold.

Step 365 can essentially determine if the virtual resource pool contains sufficient inactive transactional units to handle load fluctuation. When the preset expansion threshold is met, one or more cloud service provider subscriptions can be selected based on cost-effectiveness (i.e., increases the virtual resource pool for the lowest actual cost) in step 370.

Once the subscription(s) have been selected, the new inactive transactional units can be created using the increased cloud services in step 375. Upon completion of step 375 or when the preset expansion threshold is not met/exceeded, flow of method 340 can return to step 345 where monitoring of the composition of the virtual resource pool can continue.

Performance of steps 370 and 375 can be modified to also assess cloud service providers that the federated virtual service cloud does not have an active subscription. That is, the option to start a subscription with another cloud service provider, instead of increasing an existing active subscription to a cloud service provider.

Figure 4:
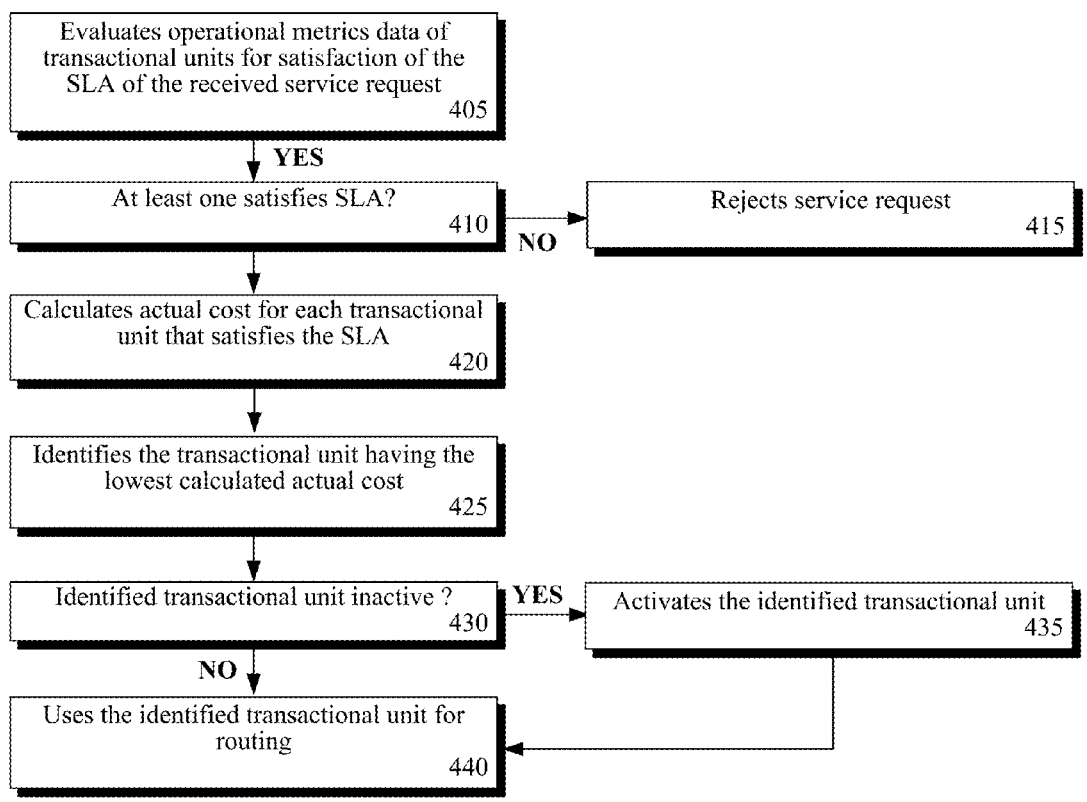
FIG. 4 is a flow chart of a method outlining the determination of the transactional unit for routing by the optimal transaction handler in accordance with embodiments of the inventive arrangements disclosed herein.

FIG. 4 is a flow chart of a method 400 outlining the determination of the transactional unit for routing by the optimal transaction handler in accordance with embodiments of the inventive arrangements disclosed herein. Method 400 can be performed within the context of system 100 and/or as a specific embodiment of step 220 of method 200.

Method 400 can begin in step 405 where the optimal transaction handler can evaluate the operational metrics data of the transactional units for satisfaction of the SLA of the received service request. The existence of at least one transactional unit satisfying the SLA can be determined in step 410.

When no transactional unit satisfies the SLA, the service request can be rejected in step 415. Alternately, step 415 can include passing the service request to another instance of the federated virtual service cloud.

When at least one transactional unit satisfies the SLA of the service request, the actual cost for each satisfying transactional unit can be calculated in step 420. In step 425, the transactional unit having the lowest calculated actual cost can be identified.

It can be determined if the identified transactional unit is currently in the inactive state in step 430. When the identified transactional unit is inactive, step 435 can execute where the identified transactional unit can be activated. Upon completion of step 435 or when the identified transactional unit is not inactive, flow can proceed to step 440 where the identified transactional unit can be used for routing of the service request.

FIG. 5 is an example lowest actual cost determination matrix 500 that can be used by the optimal transaction handler in accordance with embodiments of the inventive arrangements disclosed herein. Determination matrix 500 can be utilized within the context of system 100, methods 200, 300, 315, 340, and/or 400.

Example determination matrix 500 can list various cost factors 510 for the cloud service providers 505 being used by the optimal transaction handler. The cost factors 510 can be extracted and/or derived from the operational metrics data and/or usage-based service cost model for the cloud service providers 505.

A first set 515 of cost factors 510 can express information used when determining if the cloud service provider 505 can satisfy the SLA of the service request, which can be presented in row 525. In this example, let us assume that the service request have a response time of one sec (1000 ms) defined in the SLA.

As indicated in row 525, all cloud service providers 505 except for Cloud Y satisfy the response time. The second set 525 of cost factors 510 can represent cost-related information. In this example, the second set 525 of cost factors 510 can include the current cost to perform the transaction, the cost to provision another cloud service from the cloud service provider 505, and whether the provisioning of another cloud service is currently required or will be shortly required due to de-provisioning.

According to the contents of the example determination matrix 500, Cloud Z 505 has the lowest current transaction cost, but will require provisioning to account for an imminent de-provisioning of a cloud service. Thus, the actual cost 530 for Cloud Z 505 can be calculated as the sum of the current transaction cost and the provisioning cost, $1.75.

Cloud A 505 has the next lowest current transaction cost, but requires immediate provisioning that increases its calculated actual cost 530 to $1.74. Cloud B 505 has the highest current transactional cost of the cloud service providers 505 that satisfy the SLA. However, Cloud B 505 does not require provisioning of an additional cloud service. Thus, the calculated actual cost 530 to use Cloud B 505 remains at $0.35, which is the lowest calculated actual cost 535.

It is important to emphasize that many algorithms used by conventional federated virtual service cloud for cost-effective routing determinations focus on only the current transaction cost. As illustrated in this example determination matrix 500, the cost associated with provisioning a cloud service can have a large cost impact—a savings of 400% in this specific example.

It should also be noted that the cost factors 510 and data values contained in the example determination matrix 500 are for illustrative purposes only, and are not meant to imply a limitation to any embodiment of the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing virtual services at a lowest cost to a virtual cloud provider comprising:
   one or more processors, executing program instructions stored on one or more non-transitory storage mediums, receiving a service request from a service requestor to a virtual service cloud of a virtual cloud provider, wherein the service request has operational fulfillment requirements defined as a service-level agreement (SLA), wherein the operational fulfillment requirements comprise a request response time;
   wherein the virtual service cloud provides a plurality of different virtual services, wherein the virtual cloud service consumes resources of a virtual resource pool in providing the different virtual services, wherein resources of the virtual resource pool comprise a plurality of transactional units, wherein the transactional units represent a plurality of different cloud services provided by a set of two or more cloud service providers, wherein each of the transactional units must be provisioned within the virtual resource pool before being available for use by the virtual service cloud, wherein provisioning the transactional units within the virtual resource pool incurs a provision cost upon the virtual cloud provider, wherein use of any of the transactional units by the virtual cloud service incurs a transaction cost upon the virtual cloud provider, wherein the provisions cost and the transaction costs are cost in money;
   one or more processors, executing program instructions stored on one or more non-transitory storage mediums, determining a virtual service of the virtual service cloud able to satisfy the service request by providing a service response that also satisfies the operational fulfillment requirements;
   wherein the virtual service is able to be provided by the virtual service cloud to provide the service response consuming different sets of the transactional units, effectively achieving equivalent functional ends by utilizing different combinations of the different cloud services,
   one or more processors, executing program instructions stored on one or more non-transitory storage mediums, determining one of the different sets of transactional units to utilize for the virtual service to produce the service response by calculating a lowest monetary cost incurred by the virtual cloud provider considering provision costs and the transaction costs for the transactional units and considering an aggregate response time required of the different sets of transactional units as constrained by the request response time; and
   one or more processors, executing program instructions stored on one or more non-transitory storage mediums, providing the virtual service that consumes the determined one of the different sets to provide the service response for the service requestor within the request response time.

2. The method of claim 1, wherein at least one of the different sets of transactional units has a lower determined monetary cost than the determined one of the different sets and is not selected as being unable to satisfy the request response time.

3. The method of claim 1, wherein the virtual service cloud dynamically changes resources of the virtual resource pool by provisioning and de-provisioning transactional units, which are cloud services by the different cloud service providers.

4. The method of claim 1, wherein a cost is incurred by the virtual service cloud for maintaining a set of the transactional units as provisioned, wherein the cost is lowered by de-providing a subset of the set of transactional units.

5. The method of claim, 1, wherein one of the operational fulfillment requirements of the service request is a cost constraint on an amount the service requestor is willing to pay the virtual cloud provider for the service response, wherein the virtual cloud provider refuses to handle the service request if the monetary cost incurred by the virtual cloud provider is greater than the cost constraint.

6. The method of claim 1, wherein a latency time is incurrent by the virtual cloud provider to provision the transaction units within the virtual resource pool, wherein the virtual cloud provider incurs a provisioning cost for at least a portion of the different cloud services before a need for the different cloud services arises for any pending service request being handled by the virtual cloud service in order to satisfy future predicted requests within predicted response time parameters in a cost-effective manner.

7. The method of claim 1, wherein each of the cloud services representing the transactional units are provided by the different cloud service providers to the virtual cloud provider using differing cloud usage-based service cost models.

8. The method of claim 1, wherein the virtual cloud provider subscribes to a subset of the cloud services and provisions corresponding transactional units in the virtual resource pool in order to satisfy predicted but not yet received service requests with a lower computed cost than a predicted computed cost resulting if that subset of corresponding transactional units were not provisioned in advance of a need to satisfy pending service requests.

9. A system comprising:
one or more processors;
one or more non-transitory storage mediums;
program instructions stored on the one or more non-transitory storage mediums, wherein the one or more processors execute the program instructions to:
(A) receive a service request from a service requestor to a virtual service cloud of a virtual cloud provider, wherein the service request has operational fulfillment requirements defined as a service-level agreement (SLA), wherein the operational fulfillment requirements comprise a request response time, wherein the virtual service cloud provides a plurality of different virtual services, wherein the virtual cloud service consumes resources of a virtual resource pool in providing the different virtual services, wherein resources of the virtual resource pool comprise a plurality of transactional units, wherein the transactional units represent a plurality of different cloud services provided by a set of two or more cloud service providers, wherein each of the transactional units must be provisioned within the virtual resource pool before being available for use by the virtual service cloud, wherein provisioning the transactional units within the virtual resource pool incurs a provision cost upon the virtual cloud provider, wherein use of any of the transactional units by the virtual cloud service incurs a transaction cost upon the virtual cloud provider, wherein the provisions cost and the transaction costs are cost in money;
(B) determine a virtual service of the virtual service cloud able to satisfy the service request by providing a service response that also satisfies the operational fulfillment requirements, wherein the virtual service is able to be provided by the virtual service cloud to provide the service response consuming different sets of the transactional units, effectively achieving equivalent functional ends by utilizing different combinations of the different cloud services,
(C) determine one of the different sets of transactional units to utilize for the virtual service to produce the service response by calculating a lowest monetary cost incurred by the virtual cloud provider considering provision costs and the transaction costs for the transactional units and considering an aggregate response time required of the different sets of transactional units as constrained by the request response time; and
(D) provide the virtual service that consumes the determined one of the different sets to provide the service response for the service requestor within the request response time.

10. The system of claim 9, wherein at least one of the different sets of transactional units has a lower determined monetary cost than the determined one of the different sets and is not selected as being unable to satisfy the request response time.

11. The system of claim 9, wherein the virtual service cloud dynamically changes resources of the virtual resource pool by provisioning and de-provisioning transactional units, which are cloud services by the different cloud service providers.

12. The system of claim 9, wherein a cost is incurred by the virtual service cloud for maintaining a set of the transactional units as provisioned, wherein the cost is lowered by de-providing a subset of the set of transactional units.

13. The method of claim 9, wherein one of the operational fulfillment requirements of the service request is a cost constraint on an amount the service requestor is willing to pay the virtual cloud provider for the service response, wherein the virtual cloud provider refuses to handle the service request if the monetary cost incurred by the virtual cloud provider is greater than the cost constraint.

14. The method of claim 9, wherein a latency time is incurrent by the virtual cloud provider to provision the transaction units within the virtual resource pool, wherein the virtual cloud provider incurs a provisioning cost for at least a portion of the different cloud services before a need for the different cloud services arises for any pending service request being handled by the virtual cloud service in order to satisfy future predicted requests within predicted response time parameters in a cost-effective manner.

15. The method of claim 9, wherein each of the cloud services representing the transactional units are provided by the different cloud service providers to the virtual cloud provider using differing cloud usage-based service cost models.

16. The method of claim 9, wherein the virtual cloud provider subscribes to a subset of the cloud services and provisions corresponding transactional units in the virtual resource pool in order to satisfy predicted but not yet received service requests with a lower computed cost than a predicted computed cost resulting if that subset of corresponding transactional units were not provisioned in advance of a need to satisfy pending service requests.

17. A computer program product comprising:
one or more non-transitory storage mediums;
program instructions stored on the one or more non-transitory storage mediums, wherein the program instructions are able to be executed by one or more processors to:
- (A) receive a service request from a service requestor to a virtual service cloud of a virtual cloud provider, wherein the service request has operational fulfillment requirements defined as a service-level agreement (SLA), wherein the operational fulfillment requirements comprise a request response time, wherein the virtual service cloud provides a plurality of different virtual services, wherein the virtual cloud service consumes resources of a virtual resource pool in providing the different virtual services, wherein resources of the virtual resource pool comprise a plurality of transactional units, wherein the transactional units represent a plurality of different cloud services provided by a set of two or more cloud service providers, wherein each of the transactional units must be provisioned within the virtual resource pool before being available for use by the virtual service cloud, wherein provisioning the transactional units within the virtual resource pool incurs a provision cost upon the virtual cloud provider, wherein use of any of the transactional units by the virtual cloud service incurs a transaction cost upon the virtual cloud provider, wherein the provisions cost and the transaction costs are cost in money;
- (B) determine a virtual service of the virtual service cloud able to satisfy the service request by providing a service response that also satisfies the operational fulfillment requirements, wherein the virtual service is able to be provided by the virtual service cloud to provide the service response consuming different sets of the transactional units, effectively achieving equivalent functional ends by utilizing different combinations of the different cloud services,
- (C) determine one of the different sets of transactional units to utilize for the virtual service to produce the service response by calculating a lowest monetary cost incurred by the virtual cloud provider considering provision costs and the transaction costs for the transactional units and considering an aggregate response time required of the different sets of transactional units as constrained by the request response time; and
- (D) provide the virtual service that consumes the determined one of the different sets to provide the service response for the service requestor within the request response time.

18. The computer program product of claim 17, wherein at least one of the different sets of transactional units has a lower determined monetary cost than the determined one of the different sets and is not selected as being unable to satisfy the request response time.

19. The computer program product of claim 17, wherein the virtual service cloud dynamically changes resources of the virtual resource pool by provisioning and de-provisioning transactional units, which are cloud services by the different cloud service providers.

20. The computer program product of claim 17, wherein a cost is incurred by the virtual service cloud for maintaining a set of the transactional units as provisioned, wherein the cost is lowered by de-providing a subset of the set of transactional units.

* * * * *